R. P. CHAMPNEY.
DRIVING BELT.
APPLICATION FILED SEPT. 2, 1920.
1,394,967.
Patented Oct. 25, 1921.
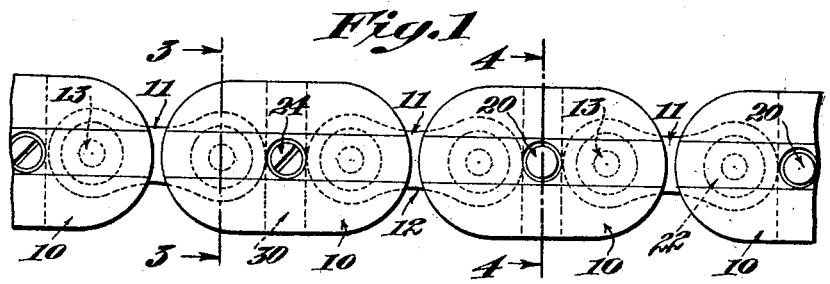
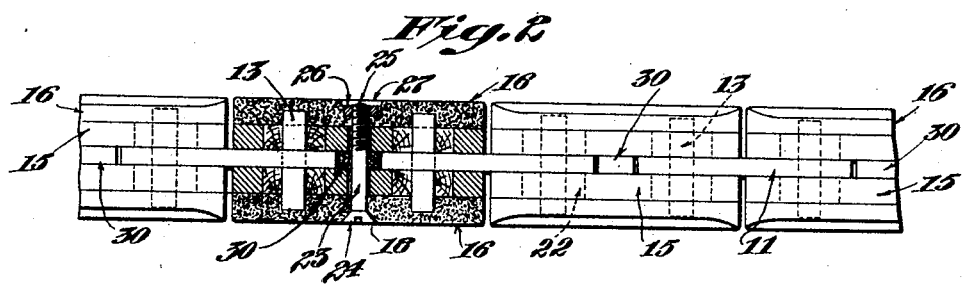
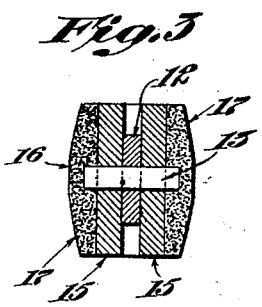
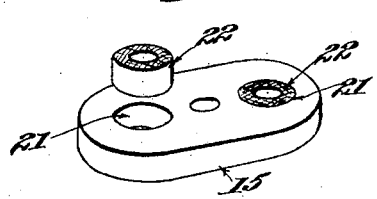
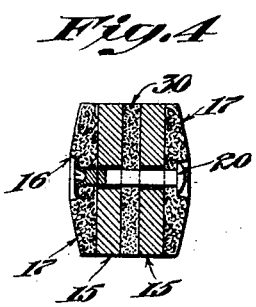
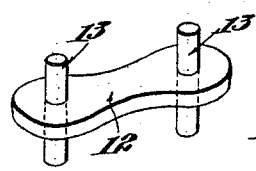
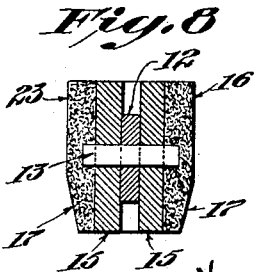
Witness
Inventor
Ralph P. Champney
by his Attorneys

UNITED STATES PATENT OFFICE.

RALPH P. CHAMPNEY, OF WORCESTER, MASSACHUSETTS, ASSIGNOR TO MITCHELL AND SMITH, INCORPORATED, OF BOSTON, MASSACHUSETTS, A CORPORATION OF MASSACHUSETTS.

DRIVING-BELT.

1,394,967.  Specification of Letters Patent.  Patented Oct. 25, 1921.

Application filed September 2, 1920. Serial No. 407,735.

*To all whom it may concern:*

Be it known that I, RALPH P. CHAMPNEY, a citizen of the United States, residing at Worcester, in the county of Worcester and State of Massachusetts, have invented certain new and useful Improvements in Driving-Belts; and I do hereby declare the following to be a full, clear, and exact description of the invention such as will enable others skilled in the art to which it appertains to make and use the same.

The present invention relates to driving belts and more particularly to belts of this character employed for driving the fans and generators of motor vehicles and for operating the generators of car lighting systems, and other similar purposes. These belts are of the general type in which the driving strain is transmitted by frictional engagement of the opposite faces of the belt with the correspondingly inclined faces of a V pulley or similar rotary member.

It is one object of the present invention to provide a link belt of this general type which will transmit comparatively large driving strains at a high speed of operation without stretching and without appreciable wear upon the connecting elements of the belt.

It is a further object of the invention to provide a simple and efficient means for detachably connecting together certain of the links of the belt in such a manner that they may be readily disconnected when so desired, but without liability of the links becoming disconnected during the operation of the belt.

With these objects in view the several features of the invention consist in certain novel features of construction and arrangements of parts hereinafter described and claimed, the advantages of which will be obvious to those skilled in the art from the following description.

In the accompanying drawings illustrating the preferred form of the invention, Figure 1 represents a side elevation of the improved belt; Fig. 2 is a top view of the belt with one of the links shown in horizontal section; Fig. 3 is a detail illustrating a sectional view upon the line 3—3 of Fig. 1; Fig. 4 is a similar view illustrating a section on the line 4—4 of Fig. 1; Fig. 5 is a detail illustrating one of the metal links with a bushing removed therefrom; Fig. 6 is a view of one of the connector links; Fig. 7 is a view of the self-locking nut forming a part of the detachable link connections; and Fig. 8 is a detail illustrating a modified form of link beveled only at the bottom.

The link belt constituting the present invention comprises a series of driving links faced with friction material and adapted to engage with the inclined faces of the driving and driven pulleys, and metal connector links interposed between the friction links and connected in such a manner that the belt as a whole has the requisite flexibility.

Upon referring to the drawings it will be observed that the belt is made up of a series of links 10 which are connected by links 11. Each of the links 11 consists of a metal plate 12 having pivot pins or studs 13 mounted in the opposite ends and projecting outwardly from the opposite faces of the link. These studs are adapted to engage in corresponding recesses formed in the ends of the links 10 to provide a flexible connection between the several links. The links 10 are composite links built up of a plurality of parts, all of which are retained in assembled position by a single fastening member which also serves to hold the links 10 and connector members 11 in assembled position. As will be observed, each of the links 10 comprises two non-stretchable plates 15 provided with facings of friction material 16 which are tapered as indicated at 17 to frictionally engage with the inclined walls of a V pulley. The two plates 15 are disposed upon opposite sides of each of the metal links 11 in the manner shown in Fig. 2 of the drawings, with the studs 13 received in apertures formed in the members 15 and 16 respectively. When thus assembled the several parts are retained in position by a transverse fastening member 18, which passes completely through the central portion of the link 10 between the ends of the connector links 11, as shown clearly in Figs. 1 and 2. This fastener member may consist of a rivet 20, as indicated in Fig. 4, the head of which is received in a recess formed in one of the friction facings and the opposite end of which is spread in a corresponding recess formed in the opposite friction facing. This type of connection is employed in those cases where it is not desired to disconnect the links 10 and 11. In certain other cases, however, where a detachable connection is desired, a different form of fastener is employed which will be more fully described hereinafter.

Belts of this type as heretofore constructed have been capable of satisfactorily transmitting light driving strains at moderate speed, but in those cases where it was desired to transmit a greater tractive effort, more especially at high speeds, it was found that breakage of the belts occurred after short periods of use. The belt constructed according to the present invention will transmit the desired tractive effort at extremely high rates of speed, and will continue to operate for a long period without appreciable wear upon the pivot connections, and without the necessity of lubricating these connections. To this end the plates 15 are formed of suitable metal and art provided with openings 21 which receive bushings 22 having openings therein adapted to closely fit the studs or pivot pins 13. In the preferred embodiment of the invention these bushings are made of self-lubricating wood or fiber and after the belt is assembled will perform their function without lubrication and without appreciable wear for extended periods. With this construction it will be observed that the driving strains upon the belt are transmitted through the connector links 11 and the oppositely disposed metal plates 15, thus providing a construction which cannot stretch or lengthen appreciably during operation. It will be further observed that although the strain upon the belt is transmitted substantially entirely through metal links, the provision of the non-metallic bushings avoids any metal to metal connection which would necessitate frequent lubrication of the pivot connections to avoid appreciable wear. It has been demonstrated that this present form of belt can be satisfactorily employed for driving certain automobile auxiliaries at exceedingly high rates of speed, whereas all existing types of belt, when employed for this purpose, necessitate frequent renewals and replacement.

It is an additional desideratum of this type of belt that it shall have provision for conveniently disconnecting certain of the links to permit replacement, provided always that the detachable connection shall not interfere with the operation of the belt, or afford the slightest opportunity for an accidental disconnecting of the links when the belt is in operation. With this end in view certain of the links are connected by a bolt 23, having a slotted head 24 received in a counter-sunk recess formed in one of the friction members 16, and an oppositely threaded end 25 adapted to engage a lock nut 26 seated in a recess 27 formed in the opposite friction member 16. The locking nut 26, as shown clearly in Figs. 2 and 7, is provided with a series of tangs 29 projecting from the bottom of the nut and adapted to be forced into the friction facing 16 as the fastener member is threaded into the nut. It has been found that this type of connection permits the links to be readily disassembled, but insures against any liability of accidental disconnection during the use of the belt. In assembling or disassembling the links 10, the fastener bolt 23 is rotated through the use of a suitable instrumentality inserted in the slotted head, the nut being held against rotary movement by the engagement of the tangs 29 with the facing 16. This type of fastening may be used at regular or irregular intervals throughout the length of the belt, permitting removal and replacement of as many groups of links as desired.

In order to avoid too great a pressure and consequent friction upon the opposing faces of the metal links when the fastener member has drawn the several parts of the links 10 together, a spacer member 30 of fiber or other suitable material, and having substantially the thickness of the plates 12, is preferably supported, as shown in Fig. 2, between the ends of the connector links 11, the spacer member having an aperture through which the fastener 18 passes. The form of belt shown in Figs. 1 to 4, inclusive, is adapted to be used with an arrangement of driving, driven and idler pulleys, the inclined faces of which engage both the top and bottom of the belt, whereas the arrangement shown in Fig. 8 is adapted to be used with driving and driven pulleys engaging only with the bottom of the belt, thus requiring only the bottom of the belt to be tapered, as indicated.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A link belt comprising a series of metal connector links each having metal pivot pins at its opposite ends, friction links alternately connected therewith, and each having oppositely disposed plates faced with friction material, and apertures lined with non-metallic bushings adapted to receive the pivot pins, spacer members located between the ends of the metal connector links, and a fastener member extending through the spacer and metal plates and adapted to retain the friction links and the metal connector links in assembled position.

2. A link belt comprising metal connector links, pivot pins projecting from opposite ends of the connector links, metal plates alternating with the connector links and having apertures formed therein, self-lubricating bushings pressed into the apertures of the metal plates and receiving the pivot pins, facings of friction material secured to the metal plates and having recesses to receive a fastener member, and a fastener member extending transversely through the metal plates and friction facings between the ends of the connector links to retain the several parts in assembled relation.

3. A link belt comprising metal connector links, pivot pins projecting from opposite ends of the connector links, supporting plates adapted to receive the connector links, friction facings for the plates, a threaded fastener member extended transversely through the plates and friction facings and having a threaded end, a nut received in a recess in one of the friction facings and having integral tangs adapted to project into the facing, and means for rotating the threaded fastener to draw the nut thereon and cause the tangs to bite into the friction facing.

RALPH P. CHAMPNEY.